US00RE50867E

(19) United States
(12) Reissued Patent
Wilf

(10) Patent Number: US RE50,867 E
(45) **Date of Reissued Patent: *Apr. 14, 2026**

(54) METHOD FOR MATCHING PEOPLE

(71) Applicant: Hyperwave Limited, Limassol (CY)

(72) Inventor: Saar Wilf, Larnaca (CY)

(73) Assignee: Hyperwave Limited, Limassol (CY)

( * ) Notice: This patent is subject to a terminal disclaimer.

(21) Appl. No.: 18/423,190

(22) Filed: Jan. 25, 2024

Related U.S. Patent Documents

Reissue of:
(64) Patent No.: 8,195,673
Issued: Jun. 5, 2012
Appl. No.: 12/574,713
Filed: Oct. 7, 2009

U.S. Applications:
(63) Continuation of application No. 17/584,044, filed on Jan. 25, 2022, now Pat. No. Re. 49,877, which is an application for the reissue of Pat. No. 8,195,673.

(51) Int. Cl.

| | |
|---|---|
| ***G06F 17/30*** | (2006.01) |
| ***G06Q 10/10*** | (2023.01) |
| ***G06Q 30/02*** | (2023.01) |
| ***G06Q 30/08*** | (2012.01) |

(52) U.S. Cl.
CPC ..... *G06Q 30/08* (2013.01); *G06Q 10/10* (2013.01); *G06Q 30/02* (2013.01)

(58) Field of Classification Search
CPC ..... G06Q 30/08; G06Q 10/10; G06Q 30/02
See application file for complete search history.

(56) References Cited

U.S. PATENT DOCUMENTS

| | | | | |
|---|---|---|---|---|
| 6,321,179 | B1 * | 11/2001 | Glance et al. | 702/189 |
| 7,203,674 | B2 | 4/2007 | Cohen | |
| 8,195,673 | B2 | 6/2012 | Wilf | |
| RE49,877 | E | 3/2024 | Wilf | |
| 2006/0282426 | A1 * | 12/2006 | Spears | 707/5 |
| 2008/0039121 | A1 * | 2/2008 | Muller et al. | 455/456.3 |
| 2011/0082885 | A1 | 4/2011 | Wilf | |

OTHER PUBLICATIONS

Mukund Deshpande et al :"Item-Based Top-N Recommendation Algorithms", University of Minnesota ACM Transactions on Information Systems, vol. 22, No. 1, Jan. 2004, pp. 143-177.
Lukas Brozovsky et al :"Recommender System for Online Dating Service", arXiv:cs/0703042v1(cs.IR), Mar. 9, 2007.

* cited by examiner

*Primary Examiner* — Woo H Choi
(74) *Attorney, Agent, or Firm* — Workman Nydegger

(57) ABSTRACT

It is provided a method of matching pairs of persons. The method includes receiving from the persons personal opinions on other persons, and based on a collaborative filtering algorithm, calculating from the personal opinions a first estimated opinion of a first person on a second person and a second estimated opinion of the second person on the first person. The method also includes matching the two persons in accordance with the estimated opinions and connecting them for a predetermined time duration. The first estimated opinions may be the estimated probability that the first person wants to be matched to the second person. The matching of the two persons is done in accordance with the product of the probabilities. Matching order is determined by a difference between a highest and a second highest product of a person in two different pairs.

20 Claims, 3 Drawing Sheets

METHOD FOR MATCHING PEOPLE

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

*CROSS-REFERENCE TO RELATED APPLICATIONS*

*Notice: More than one reissue application has been filed for the reissue of U.S. Pat. No. 8,195,673. The present application is a continuation reissue application of application Ser. No. 17/584,044 filed Jan. 25, 2022 which is a reissue application of application Ser. No. 12/574,713 filed Oct. 7, 2009, issued as U.S. Pat. No. 8,195,673 on Jun. 5, 2012. The present application is also a reissue of U.S. Pat. No. 8,195,673.*

BACKGROUND OF THE INVENTION

1. Field of the Invention

The present invention relates to a method and system for finding matches between people, and more specifically to matching people connected to an online dating service.

2. Description of Related Art

The Internet has become a popular medium for creating social relationships, and especially romantic relationships.

Many online dating websites exist, which allow user to view other users' profiles and contact those they are interested in.

Some dating websites try to match people according to their answers to a set of questions. Examples of these include www.chemistry.com, www.eharmony.com, and www.okcupid.com. Drawbacks of such methods are that they don't take into account physical appearance and that questionnaires may fail to capture many aspects of ones' personality.

U.S. Pat. No. 7,203,674 describes a method and system for connecting and matching users in an electronic dating service. Users are connected for a brief period, and are allowed further contact with each other if both request so.

Collaborative Filtering is the concept of predicting the opinion of one user on an item, based on his opinion on other items, and the opinions of other users on that item and the other items.

The publication "Item-Based Top-N Recommendation Algorithms" by Mukund Deshpande and George Karypis (published in "ACM Transactions on Information Systems" Volume 22, Issue 1, pp. 143-177, 2004) describes one Collaborative Filtering algorithm.

The publication "Recommender System for Online Dating Service" by Lukas Brozovsky and Vaclav Petricek, proposes using Collaborative Filtering in online dating. However, as the authors acknowledge, Collaborative Filtering is not well suited for online dating, for the following reasons:

1. While one item can be recommended to a large number of users, it would be inappropriate to recommend the same person to a large number of people in a dating context.
2. Unlike a person-to-item match, a person-to-person match should be bilateral—each side should find the other desirable.

There is an evident need for an efficient method for finding matches between people.

BRIEF SUMMARY OF THE INVENTION

It is provided a method of matching several pairs out of a plurality of persons. The method includes receiving from the persons personal opinions on other persons, based on at least a collaborative filtering algorithm, calculating from the personal opinions a first estimated opinion of a first person on a second person and a second estimated opinion of the second person on the first person, and matching the first person and the second person in accordance with the first and second estimated opinions. The collaborative filtering algorithm is a method of estimating opinion of a person on a certain object based on opinions of the person on other objects, and opinions of other persons on the certain object and some of the other objects. The method may include connecting the first person and the second person for a predetermined time duration. The connecting is done using a communications channel like text chat over internet protocol, voice over internet protocol, video over internet protocol, and electronic mail. The method may further include receiving a first personal opinion of the first person on the second person and a second personal opinion of the second person on the first person. Also, the method may include providing mutual communication details to the first person and to the second person in accordance with the first personal opinion and the second personal opinion. Exemplary communication details are electronic mail address, phone number, instant messaging address and physical address.

In some embodiments, the first estimated opinion is the estimated probability that the first person wants to be matched to the second person, and the second estimated opinion is the estimated probability that the second person wants to be matched to the first person. The matching of the first person and the second person is done in accordance with the result of the multiplication of the probabilities. The order of matching may be determined in accordance with a difference between a highest multiplication result of a person in a pair with any other person and the second highest multiplication result said person has in a different pair.

In some embodiments, a program storage device readable by a computerized apparatus, is tangibly embodying a program of instructions executable by the computerized apparatus to perform the method of matching pairs of several persons.

It is provided a computerized system for matching several pairs out a plurality of persons. The persons are communicating with the system using a wide area network. The system is configured to execute the aforementioned methods.

BRIEF DESCRIPTION OF THE DRAWINGS

The subject matter regarded as the invention is particularly pointed out and distinctly claimed in the concluding portion of the specification. The invention, however, both as to system organization and method of operation, together with features and advantages thereof, may best be understood by reference to the following detailed description when read with the accompanied drawings in which:

DESCRIPTION OF PREFERRED EMBODIMENTS

Figure 1:
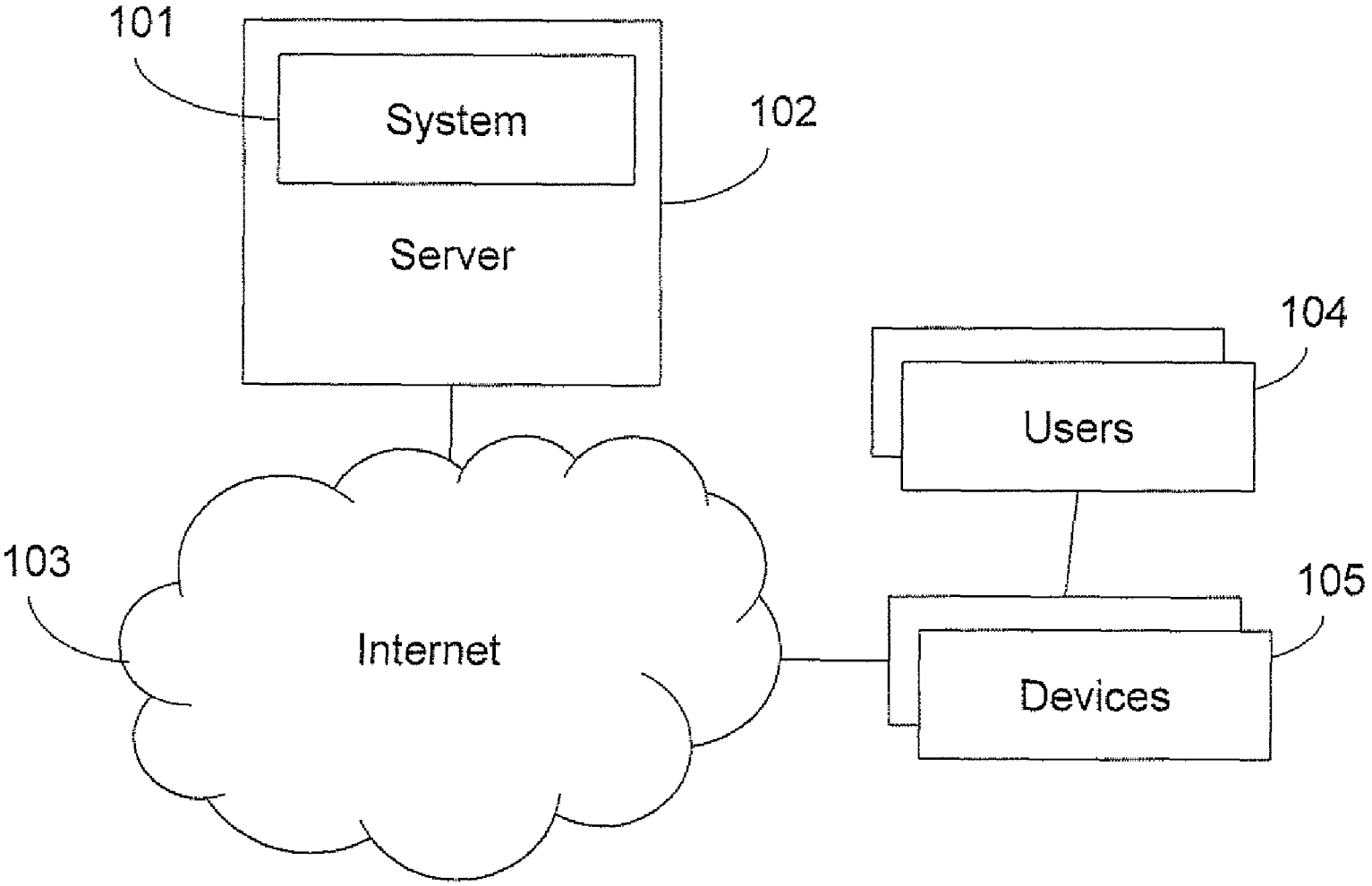
FIG. 1 is a block diagram of a system for matching pairs of persons.

The present invention will now be described in terms of specific example embodiments. It is to be understood that the invention is not limited to the example embodiments disclosed. It should also be understood that not every feature of the methods and system handling the method is necessary to implement the invention as claimed in any particular one of the appended claims. Various elements and features of the method are described to fully enable the invention. It should also be understood that throughout this disclosure, where a method is shown or described, the steps of the method may be performed in any order or simultaneously, unless it is clear from the context that one step depends on another being performed first.

Before explaining several embodiments of the invention in detail, it is to be understood that the invention is not limited in its application to the details as set forth in the following description or illustrated in the drawings. The invention is capable of other embodiments or of being practiced or carried out in various ways. Also, it is to be understood that the phraseology and terminology employed herein is for the purpose of description and should not be regarded as limiting.

Unless otherwise defined, all technical and scientific terms used herein have the same meaning as commonly understood by one of ordinary skill in the art to which this invention belongs. The systems, methods, and examples provided herein are illustrative only and not intended to be limiting.

In the description and claims of the present application, each of the verbs "comprise", "include" and "have", and conjugates thereof, are used to indicate that the object or objects of the verb are not necessarily a complete listing of members, components, elements or parts of the subject or subjects of the verb.

It is an object of the present invention to allow effective matching between people by using Collaborative Filtering.

The System

FIG. 1 is a diagram of the environment in which the system operates. The System 101 is preferably software running on a Server 102, connected to the Internet 103. Users 104 connect to the Internet using Devices 105 running Internet Browsers such as Microsoft Internet Explorer or Mozilla FireFox. The Users 104 direct their Browsers to connect to the Server, where they are presented with a User Interface to the System 101.

The Process

Figure 2:
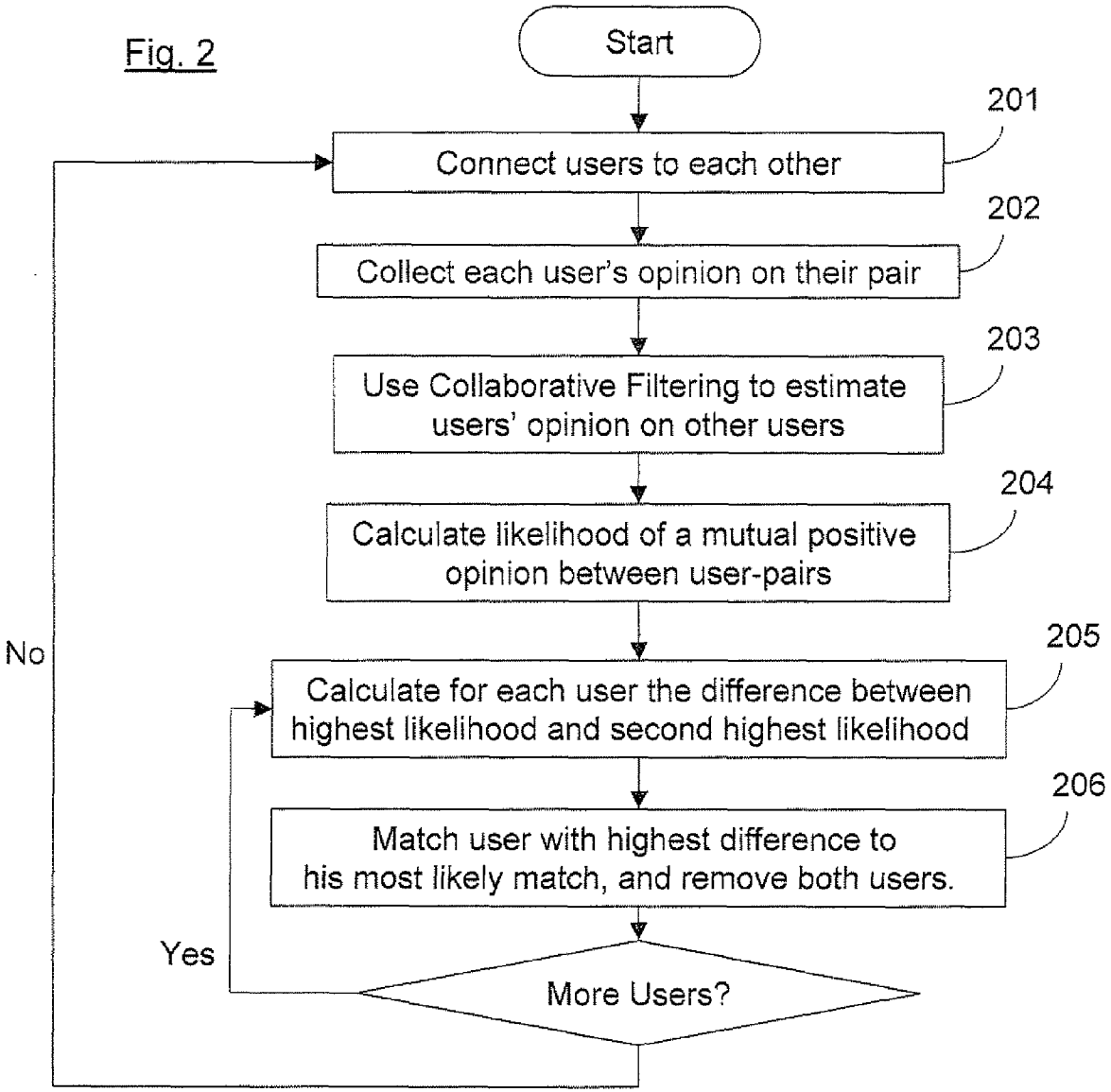
FIG. 2 is a flowchart of a method for matching pairs of persons.

FIG. 2 is a diagram of the process performed by the System once Users are connected to it:

In step 201 some or all of the Users are each connected to another User. This connection may be done using text chat, voice, video, email or any other suitable medium. The System may additionally present to each User information about the other User, such as age, gender, location, a picture etc. In one preferred embodiment, the connection is limited in time.

In step 202 each of the connected Users is asked for his opinion about the User he was just connected to. The opinion may be a score or a decision on whether he would like to further communicate with the other User. The opinions are stored.

The System then attempts to match between Users. The System's goal is to find matches that have a relatively high likelihood of being successful (i.e. a match in which each User has a positive opinion on the other).

The System matches Users by estimating the opinion each User would have on all or some of the other Users, and choosing the matches in which both Users are estimated to have a positive opinion on the other User.

In step 203, the System uses Collaborative Filtering to estimate opinions. In other words, the opinions the User gave on other Users is compared to the opinions other Users gave, in order to predict the opinion of the User on Users for which he did not yet give an opinion. Any effective Collaborative Filtering algorithm may be used for this purpose.

Once the System has estimated opinions of all Users on all (or some of the) other Users, it attempts to make one-to-one matches that create the overall highest number of successful matches.

In order to simplify the matching process, in step 204 the System first normalizes all estimated opinions to represent the likelihood (between 0 and 1) that a User will have a positive opinion on another User. The system then multiplies each likelihood by the opposite likelihood (that the other User will have a positive opinion on the first User), thereby reaching the likelihood that both Users will have a positive opinion on each other.

In step 205, the system then calculates for each User the difference between his highest likelihood match and his second highest likelihood match ("likelihood difference"). The likelihood difference represents the 'importance' of matching that User to his most likely match.

In step 206, the system finds the User who had the highest likelihood difference, and matches him to his most likely match.

The two matched Users are removed from the list, and the process is repeated from step 205 until no more Users remain or no more effective matches (i.e. matches with high likelihood of mutual positive opinion) can be found.

Once the matching process is complete, each User is connected to their match, as in step 201, and the process is repeated. In each iteration of the process, more information about Users' opinions is accumulated, which should result in higher accuracy of the Collaborative Filtering algorithm and overall matching.

In a preferred embodiment of the present invention, additional filtering is applied to the matches. For example, a female user may require to be matched only to male users aged 25-30. This may be enforced in step 204 by placing a likelihood of 0 for the match between that female user and all users not matching the criteria. This process can also be applied to all user-pairs who were already connected, thereby preventing repeated matches.

In one embodiment of the present invention, if both Users provided in step 202 a positive opinion on the other, then they are provided mutual communication details such as email address, phone number, instant messaging address, or physical address.

Since the process described above involves checking the match between all possible user-pairs, processing time may become unacceptable when servicing a large number of Users. In such a case, the System may divide the Users to smaller groups, and run the process on each group separately. This may of course cause the System to miss possible matches. To reduce this effect, the System may place each User in several groups, as well as choose groups that are a-priori more likely to create good matches (e.g. group together Users of similar age and location).

Figure 3:
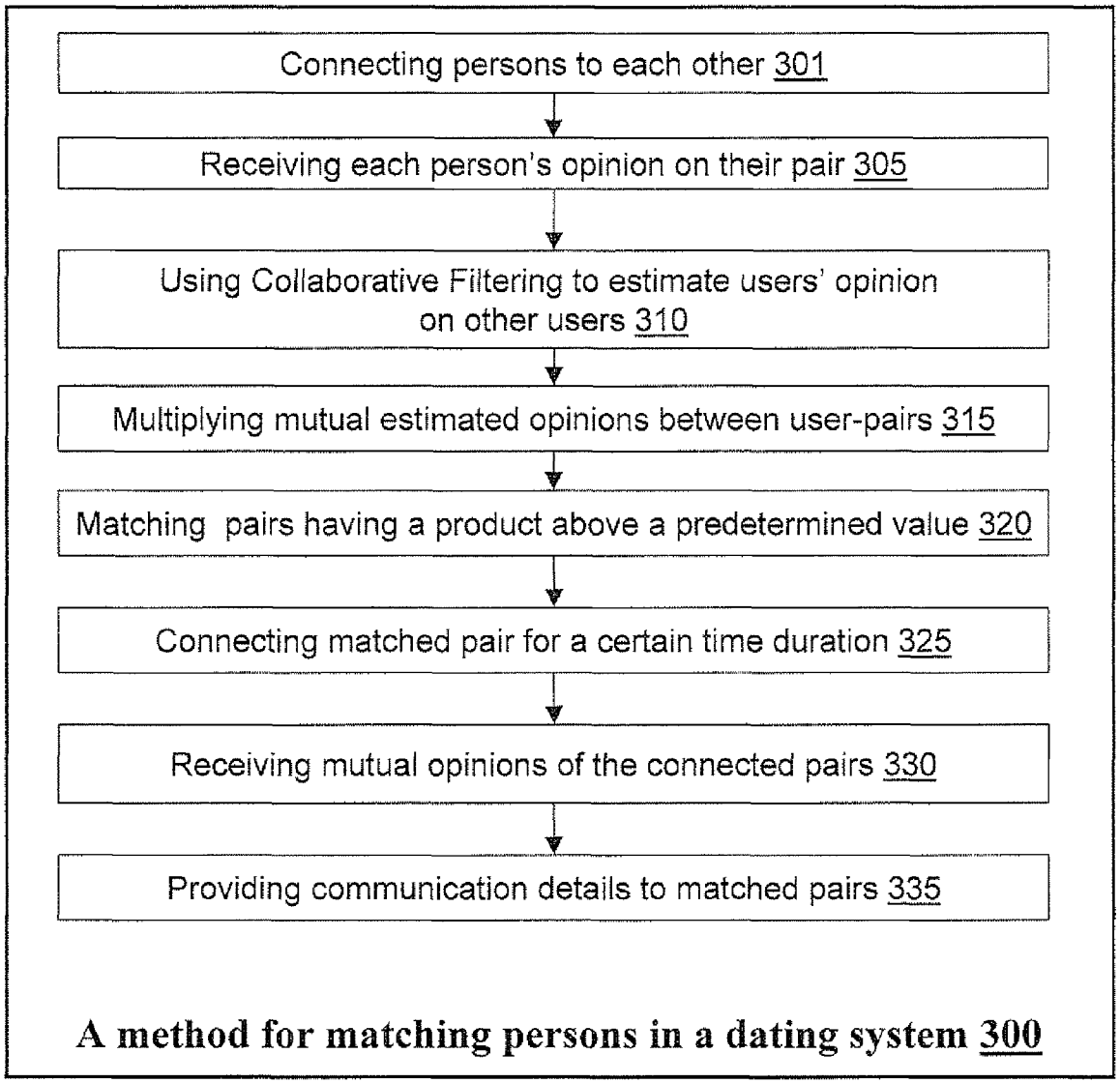
FIG. 3 is a flowchart of a method for matching pairs of persons.

Referring now to FIG. 3, which describes another embodiment of the current invention, it is provided a method 300 of matching several pairs out of a plurality of persons. The method includes step 301 of connecting persons to each other, step 305 of receiving from the persons personal opinions on other persons, step 310 of calculating from the personal opinions a first estimated opinion of a first person on a second person and a second estimated opinion of the second person on the first person, based on at least a collaborative filtering algorithm, step 315 of multiplying mutual estimated opinions for user-pairs, and step 320 of matching the first person and the second person in accordance with the first and second estimated opinions.

In some embodiments, the method may include the step 325 of connecting the first person and the second person for a predetermined time duration. The connecting is done using a communications channel like text chat over internet protocol, voice over internet protocol, video over internet protocol, and electronic mail. The method may further include the step 330 of receiving a first personal opinion of the first person on the second person and a second personal opinion of the second person on the first person. Also, the method may include the step 335 of providing mutual communication details to the first person and to the second person in accordance with the first personal opinion and the second personal opinion. Exemplary communication details are electronic mail address, phone number, instant messaging address and physical address.

In some embodiments, the first estimated opinion is the estimated probability that the first person wants to be matched to the second person, and the second estimated opinion is the estimated probability that the second person wants to be matched to the first person. The matching 320 of the first person and the second person is done in accordance with the result of the multiplication of the probabilities.

While the present invention mainly discusses aspects related to online dating, it will be appreciated by persons skilled in the art that it may be easily extended to other situations applicable to matching people, such as non-romantic social relationships and business relationships.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

What is claimed is:

[1. A method of matching one or more pairs of persons out of four or more persons, the method comprising:

a. receiving from the four or more persons three or more personal opinions, each personal opinion being an opinion of a certain person on another person of said four or more persons, such that at least one personal opinion of a first person on a second person being absent;

b. based on at least a collaborative filtering algorithm, calculating from the personal opinions at least a first estimated opinion of a first person on a second person, said collaborative filtering algorithm being a method of estimating an estimated opinion of a specific person on a certain object based on;

(i) a first group of opinions comprising opinions of said specific person on objects other than said certain object; and (ii) a second group of opinions comprising opinions of persons other than said specific person on said certain object and some of the objects other than said certain object;

and c. matching said first person and said second person in accordance with the estimated opinion of said first person on said second person and a personal opinion or an estimated opinion of said second person on said first person.]

[2. The method of claim 1 further comprising connecting the first person and the second person.]

[3. The method of claim 2, wherein said connecting is limited to a predetermined time duration.]

[4. The method of claim 2, wherein said connecting is done using a communications channel selected from a group of channels consisting of text chat over internet protocol, voice over internet protocol, video over internet protocol, and electronic mail.]

[5. The method of claim 2, wherein subsequent to the step of:

connecting the first person and the second person, the method further comprising the step of receiving a first personal opinion of the first person on the second person and a second personal opinion of the second person on the first person.]

[6. The method of claim 5, further comprising providing mutual communication details to said first person and to said second person in accordance with said first personal opinion and said second personal opinion.]

[7. The method of claim 6, wherein said communication details are selected from a group consisting of: electronic mail address, phone number, instant messaging address and physical address.]

[8. The method of claim 1 wherein the method includes estimating a probability that the first person wants to be matched to the second person, and a probability that the second person wants to be matched to the first person.]

[9. The method of claim 8 wherein the matching of said first person and said second person is done in accordance with the result of a multiplication of the probabilities.]

[10. The method of claim 9 wherein order of matching is determined in accordance with a difference between a highest multiplication result of a person in a pair with any other person and the second highest multiplication result said person has in a different pair.]

[11. A program storage device readable by a computerized apparatus, tangibly embodying a program of instructions executable by the computerized apparatus to perform the method of claim 1.]

[12. A server connected to a wide area network, for matching one or more pairs of persons out of four or more persons, the persons communicating with the server using the wide area network, the server comprising:

a computer;

wherein the computer is operated:

(a) to receive from the four or more persons three or more personal opinions, each personal opinion being an opinion of a certain person on another person of said four or more persons, such that at least one personal opinion of a first person on a second person being absent;

(b) to calculate from the personal opinions at least a first estimated opinion of said first person on said second person, based on at least a collaborative filtering algorithm, said collaborative filtering algorithm being a method of estimating an estimated opinion of a specific person on a certain object based on;

(i) a first group of opinions comprising opinions of said specific person on objects other than said certain object; and (ii) a second group of opinions comprising opinions of persons other than said specific person on said certain object and some of the objects other than said certain object;

and (c) to match said first person and said second person in accordance with the estimated opinion of said first person on said second person and the personal or estimated opinion of said second person on said first person.]

*13. A method of matching one or more pairs of persons out of a group of persons to be matched including at least four persons, the method comprising:*

*a. receiving from the at least four persons three or more personal opinions, each personal opinion being an opinion of a certain person on another person of the at least four persons, such that at least one personal opinion of a first person on a second person of the at least four persons is absent;*

*b. based on at least a collaborative filtering algorithm, calculating from the three or more personal opinions at least a first estimated opinion of the first person on the second person, the first estimated opinion being a likelihood that the first person will have a positive opinion on the second person, said collaborative filtering algorithm being a method of estimating an estimated opinion of a specific person on a certain object based on:*

*(i) a first group of opinions comprising opinions of said specific person on objects other than said specific object, and*

*(ii) a second group of opinions comprising opinions of persons other than said specific person on said certain object and some of the objects other than said certain object; and*

*c. facilitating an increase in a number of successful matches of persons from the group of persons to be matched by at least:*

*(i) matching said first person and said second person in accordance with the first estimated opinion of said first person on said second person and a personal opinion or an estimated opinion of said second person on said first person, each successful match being a one-to-one match that has or is predicted to have a high likelihood of mutual positive opinion between persons in each successful match; and*

*(ii) removing two matched users who are included in a successful match from the group of persons to be matched and making one or more additional successful matches from the group of persons to be matched until it is determined that there are no additional successful matches to be found in the group of persons to be matched.*

*14. The method of claim 13 further comprising connecting the first person and second person.*

*15. The method of claim 14, wherein said connecting is limited to a predetermined time duration.*

*16. The method of claim 14, wherein said connecting is done using a communications channel selected from a group of channels consisting of text chat over internet protocol, voice over internet protocol, video over internet protocol, and electronic mail.*

*17. The method of claim 14, wherein subsequent to connecting the first person and the second person, the method further comprising receiving a first personal opinion of the first person on the second person and a second personal opinion of the second person on the first person.*

*18. The method of claim 17, further comprising providing mutual communication details to said first person and to said second person in accordance with said first personal opinion and said second personal opinion.*

*19. The method of claim 18, wherein said communication details are selected from the group consisting of: electronic mail address, phone number, instant messaging address and physical address.*

*20. The method of claim 13, wherein said first estimated opinion is an estimated probability that the first person wants to be matched to the second person, and said second estimated opinion is the estimated probability that the second person wants to be matched to the first person.*

*21. The method of claim 20, wherein the matching of said first person and said second person is done in accordance with a result of one or more multiplications of said probabilities.*

*22. The method of claim 21, wherein order of matching is determined in accordance with a difference between a highest multiplication result of a person in a pair with any other person and a second highest multiplication result said person has in a different pair.*

*23. A program storage device readable by a computerized apparatus, tangibly embodying a program of instructions executable by the computerized apparatus to perform the method of claim 13.*

*24. A server connected to a wide area network, for matching one or more pairs of persons out of a group of persons, the group of persons comprising at least four persons, the persons communicating with the server using the wide area network, the server comprising:*

*a computer;*

*wherein the computer is operated:*

*(a) to divide the group of persons to be matched into two or more smaller groups, each of the two or more smaller groups comprising four persons; and*

*(b) for each of the two or more smaller groups, to perform the following:*

*receive from the four persons three or more personal opinions, each personal opinion being an opinion of a certain person on another person of said four persons, such that at least one personal opinion of a first person on a second person is absent;*

*to calculate from the personal opinions at least a first estimated opinion of said first person on said second person, based on at least a collaborative filtering algorithm, said collaborative filtering algorithm being a method of estimating an estimated opinion of a specific person on a certain object based on:*

*(i) a first group of opinions comprising opinions of said specific person on objects other than said certain object, and*

*(ii) a second group of opinions comprising opinions of persons other than said specific person on said certain object and some of the objects other than said certain object; and*

*to match said first person and said second person in accordance with the first estimated opinion of said first person on said second person and a personal opinion or an estimated opinion of said second person on said first person,*

*wherein a processing time for matching pairs of persons for the two or more smaller groups is less than a comparative processing time required for matching the pairs of persons for the group of*

*persons to be matched without first dividing the group of persons into the two or more smaller groups.*

*25. The server of claim 24, wherein dividing the group of persons to be matched into the two or more smaller groups includes putting at least one person of the group of persons into two or more different smaller groups to be processed separately.*

*26. The server of claim 24, wherein the dividing the group of persons into the smaller groups is based on age such that the at least one smaller group comprises one or more persons of similar age.*

*27. The server of claim 24, wherein the dividing the group of persons into the smaller groups is based on location such that the at least one smaller group comprises one or more persons of similar location.*

*28. A method implemented by a server connected to a wide area network, for matching one or more pairs of persons out of a group of persons, the group of persons comprising four persons, the persons communicating with the server using the wide area network, the method comprising the server performing the following:*

*(a) dividing the group of persons to be matched into two or more smaller groups, each of the two or more smaller groups comprising four persons; and*

*(b) for at least one of the two or more smaller groups, performing the following:*

*receiving from the four persons three or more personal opinions, each personal opinion being an opinion of a certain person on another person of said four persons, such that at least one personal opinion of a first person on a second person is absent;*

*calculating from the personal opinions at least a first estimated opinion of said first person on said second person, based on at least a collaborative filtering algorithm, said collaborative filtering algorithm being a method of estimating an estimated opinion of a specific person on a certain object based on:*

*(i) a first group of opinions comprising opinions of said specific person on objects other than said certain object, and*

*(ii) a second group of opinions comprising opinions of persons other than said specific person on said certain object and some of the objects other than said certain object; and*

*matching said first person and said second person in accordance with the first estimated opinion of said first person on said second person and a personal opinion or an estimated opinion of said second person on said first person,*

*wherein a processing time for matching pairs of persons for the two or more smaller groups is less than a comparative processing time required for matching the pairs of persons for the group of persons to be matched without first dividing the group of persons into the two or more smaller groups.*

*29. The method of claim 28, wherein dividing the group of persons to be matched into the two or more smaller includes putting at least one person of the group of persons into two or more different smaller groups to be processed separately.*

*30. The method of claim 28, wherein the dividing the group of persons into the smaller groups is based on age such that the at least one smaller group comprises one or more persons of similar age.*

*31. The method of claim 28, wherein the dividing the group of persons into the smaller groups is based on location such that the at least one smaller group comprises one or more persons of similar location.*

*32. The method of claim 13, wherein said matching is at least partially based on a determination that said first person and said second person have expressed an interest in at least one of: a romantic relationship, a non-romantic social relationship, or a business relationship.*

* * * * *